(12) United States Patent
Shirvell (10) Patent No.: US 6,739,823 B2
(45) Date of Patent: May 25, 2004

(54) MOTORCYCLE LOADING AND UNLOADING APPARATUS

(76) Inventor: Louis K. Shirvell, 14516-81 Street, Edmonton, Alberta (CA), T5C 1P2

( * ) Notice: Subject to any disclaimer, the term of this patent is extended or adjusted under 35 U.S.C. 154(b) by 0 days.

(21) Appl. No.: 10/314,476

(22) Filed: Dec. 9, 2002

(65) Prior Publication Data

US 2003/0108411 A1 Jun. 12, 2003

(30) Foreign Application Priority Data

Dec. 10, 2001  (CA) .............................................. 2364887

(51) Int. Cl.$^7$ ................................................. B60P 9/00
(52) U.S. Cl. ....................................................... 414/462
(58) Field of Search ................................ 414/462, 477, 414/494, 498, 500

(56) References Cited

U.S. PATENT DOCUMENTS

| | | | | | |
|---|---|---|---|---|---|
| 2,745,566 | A | * | 5/1956 | Bouffard | 414/494 |
| 3,591,029 | A | * | 7/1971 | Coffey | 414/462 |
| 3,612,366 | A | * | 10/1971 | Schneider et al. | 414/462 |
| 3,734,322 | A | * | 5/1973 | Vaillancourt | 414/462 |
| 3,777,921 | A | * | 12/1973 | Nelson | 414/462 |
| 3,805,984 | A | * | 4/1974 | Schwarz et al. | 414/462 |
| 3,843,001 | A | * | 10/1974 | Willis | 414/462 |
| 3,883,020 | A | * | 5/1975 | Dehn | 414/498 |
| 3,931,903 | A | * | 1/1976 | Johnson | 414/462 |
| 4,046,297 | A | * | 9/1977 | Bland | 224/504 |
| 4,189,274 | A | * | 2/1980 | Shaffer | 414/789.6 |
| 4,212,580 | A | * | 7/1980 | Fluck | 414/522 |
| 4,274,788 | A | * | 6/1981 | Sutton | 414/462 |
| 4,275,981 | A | * | 6/1981 | Bruhn | 414/462 |
| 4,790,713 | A | * | 12/1988 | Miller | 414/462 |
| 4,813,841 | A | * | 3/1989 | Eischen | 414/477 |
| 4,932,829 | A | | 6/1990 | Miller | 414/462 |
| 5,069,595 | A | * | 12/1991 | Smith et al. | 414/462 |
| 5,108,248 | A | * | 4/1992 | Murrill | 414/462 |
| 5,133,634 | A | * | 7/1992 | Gingrich et al. | 414/537 |
| 5,232,329 | A | * | 8/1993 | Livingston | 414/494 |
| 5,431,525 | A | * | 7/1995 | Scott | 414/538 |
| 5,511,928 | A | * | 4/1996 | Ellis | 414/462 |
| 5,649,803 | A | * | 7/1997 | Bennett | 414/537 |
| 5,730,577 | A | | 3/1998 | Jones | 414/462 |
| 5,810,546 | A | * | 9/1998 | Schmoling | 414/538 |
| 5,846,047 | A | | 12/1998 | Riekki | 414/494 |
| 5,897,284 | A | * | 4/1999 | Ardohain | 414/522 |
| 5,934,863 | A | * | 8/1999 | Beck | 414/538 |
| 5,984,339 | A | * | 11/1999 | Guild | 280/402 |
| 6,106,215 | A | * | 8/2000 | Goulet | 414/538 |
| 6,176,672 | B1 | * | 1/2001 | Egan et al. | 414/462 |
| 6,244,813 | B1 | * | 6/2001 | Cataldo | 414/462 |
| 6,354,777 | B1 | * | 3/2002 | Riekki | 410/3 |
| 6,524,056 | B1 | * | 2/2003 | Kloster | 414/538 |
| 6,599,078 | B1 | * | 7/2003 | Elder | 414/542 |
| 6,634,849 | B2 | * | 10/2003 | Clary | 414/538 |

OTHER PUBLICATIONS

RMX, PAK–RAK III, computer printout sheets, 10 pages, dated Jun. 25, 2001.

* cited by examiner

*Primary Examiner*—Douglas Hess
(74) *Attorney, Agent, or Firm*—Christensen O'Connor Johnson Kindness PLLC (57) ABSTRACT

A motorcycle loading and unloading apparatus includes a motorcycle support with a first guide extending along the support. A pivot member is pivotally secured to a mounting member for pivotal movement about a substantially horizontal axis between a downwardly angled position and an upright position. A second guide is secured to the second end of the pivot member and engages the first guide on the support. Movement of the support from a loading position resting upon a groundsurface to a transport position resting upon a bed of the truck is accommodated by an initial pivoting of the pivot member from the downwardly angled position to the upright position. This is followed by a sliding of the support along the pivot member until the support is in the transport position.

10 Claims, 7 Drawing Sheets

MOTORCYCLE LOADING AND UNLOADING APPARATUS

FIELD OF THE INVENTION

The present invention relates to an apparatus specifically designed for use in loading a motorcycle onto a bed of a truck and, subsequently, unloading the motorcycle.

BACKGROUND OF THE INVENTION

A number of loading and unloading apparatus have been developed which are dedicated for use with motorcycles. Examples of such motorcycle loading and unloading apparatus are U.S. Pat. No. 4,932,829 (Miller); U.S. Pat. No. 5,730,577 (Jones); and U.S. Pat. No. 5,846,047 (Rickki).

The Miller reference discloses a motorcycle loading and unloading apparatus having a rectangular insert which is inserted into the hitch receptacle of a truck.

SUMMARY OF THE INVENTION

The present invention provides an alternative motorcycle loading and unloading apparatus.

According to the present invention there is provided a motorcycle loading and unloading apparatus which includes a motorcycle support with a first guide extending along the support. A mounting member is provided which is adapted for mounting adjacent to and substantially perpendicular to a rear bumper of a truck. A pivot member is provided having a first end and a second end. The first end of the pivot member is pivotally secured to the mounting member for pivotal movement about a substantially horizontal axis extending transverse to the mounting member between a downwardly angled position and an upright position. A second guide is secured to the second end of the pivot member and engages the first guide on the support. Means is provided for exerting a force upon the support to move the support from a loading position resting upon a groundsurface behind the truck to a transport position resting upon a bed of the truck. Movement of the support from the loading position to the transport position is accommodated by an initial pivoting of the pivot member from the downwardly angled position to the upright position. This is followed by a sliding of the support along the pivot member until the support is in the transport position.

The motorcycle loading and unloading apparatus, as described above, provides a suitable alternative that does not need be secured to the bed of the truck.

The guides used can take a number of forms. Beneficial results have been obtained when the support has opposed sides and one of a pair of first guides extends along each of the opposed sides.

Although the mounting member for the motorcycle loading and unloading apparatus, as described above, can be mounted directly to the rear of the truck, it is preferred that the apparatus be readily removable. Even more beneficial results may, therefore, be obtained when the mounting member has a first end and a second end. The first end is in the form of a hitch adaptor adapted for insertion into a hitch receptacle of the truck. This enables the mounting member to be rapidly inserted or removed from the hitch receptacle.

With the motorcycle loading and unloading apparatus, as described above, the preferred means for exerting a force upon the support to move the support from the loading position to the transport position is a winch and cable.

The support has a first end and a second end. The described movement of the support results in the support being dragged for a distance along the ground. Even more beneficial may, therefore, be obtained when underlying roller wheels are rotatably mounted at the second end of the support.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

The preferred embodiment, a motorcycle loading and unloading apparatus generally identified by reference numeral 10, will now be described with reference to FIGS. 1 through 8.

In the above FIGURES a motorcycle is represented by a pair of wheels a front wheel 60 and a rear wheel 66.

Figure 1:
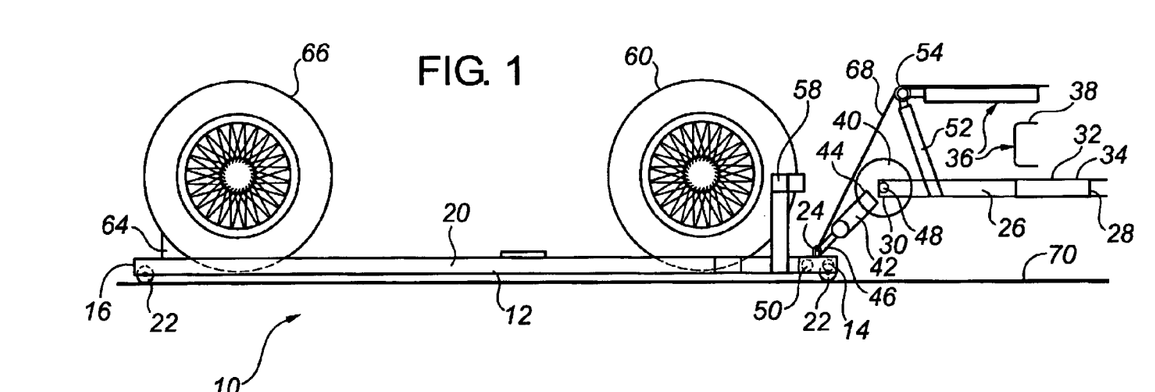
FIG. 1 is side elevation view of a motorcycle loading and unloading apparatus constructed in accordance with the teachings of the present invention with motorcycle support resting in a loading position and pivot member in a downwardly angled position.
Figure 5:
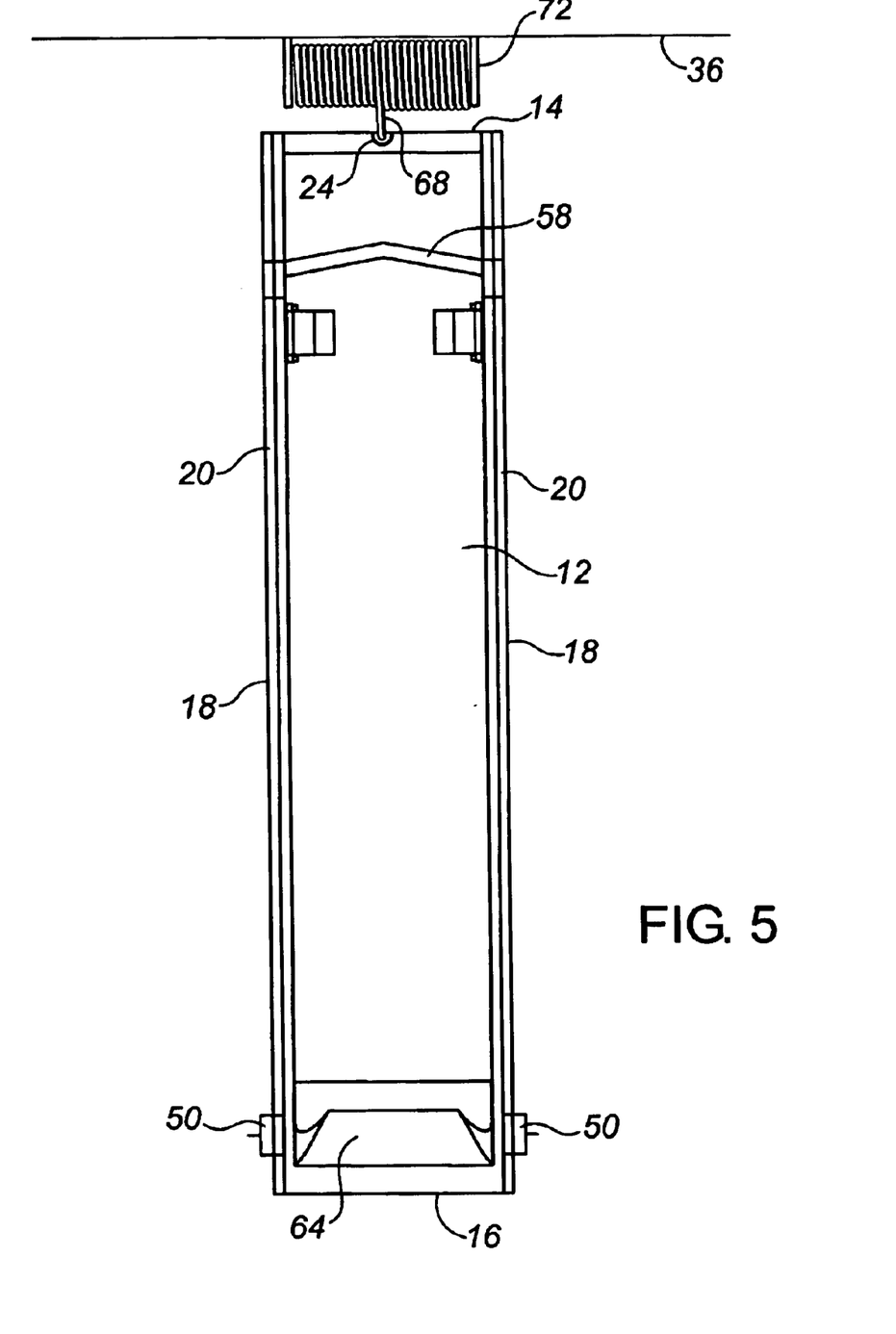
FIG. 5 is a top plan view of the support illustrated in FIG. 1.

Structure and Relationship of Parts:

Referring to FIG. 1, there is provided a motorcycle loading and unloading apparatus 10, which includes a motorcycle support 12 that has a first end 14, a second end 16 and opposed sides 18. Referring to FIG. 5, one of a pair of first guides extends along each of opposed sides 18 of support 12. It is preferred that first guides be in the form of guide tracks 20. Referring to FIG. 1, underlying roller wheels 22 are rotatably mounted at first end 14 and second end 16 of support 12. A cable coupling 24 is provided at first end 14 of support 12.

A mounting member 26 is provided that has a first end 28 and a second end 30. First end 28 is a hitch adaptor 32 adapted for insertion into a hitch receptacle 34 of a truck 36 such that mounting member 26 is positioned adjacent to and substantially perpendicular to a rear bumper 38 of truck 36. Positioned at second end 30 is a circular pivot guide 40.

A pivot member 42 is provided that has a first end 44 and a second end 46. First end 44 of pivot member 42 is pivotally secured to mounting member 26 for pivotal movement within circular pivot guide 40 about a substantially horizontal axis defined by pivot pin 48 that extends transverse to mounting member 26. The sequential pivotal movement of pivot member 42 can be observed in FIGS. 1 through 4. It can be seen that pivot member 42 pivots between a downwardly angled position when support 12 rests upon a groundsurface 70 as illustrated in FIG. 1 and an upright position as illustrated in FIG. 4 when support 12 is being moved across a cargo box of a truck.

Figure 6:
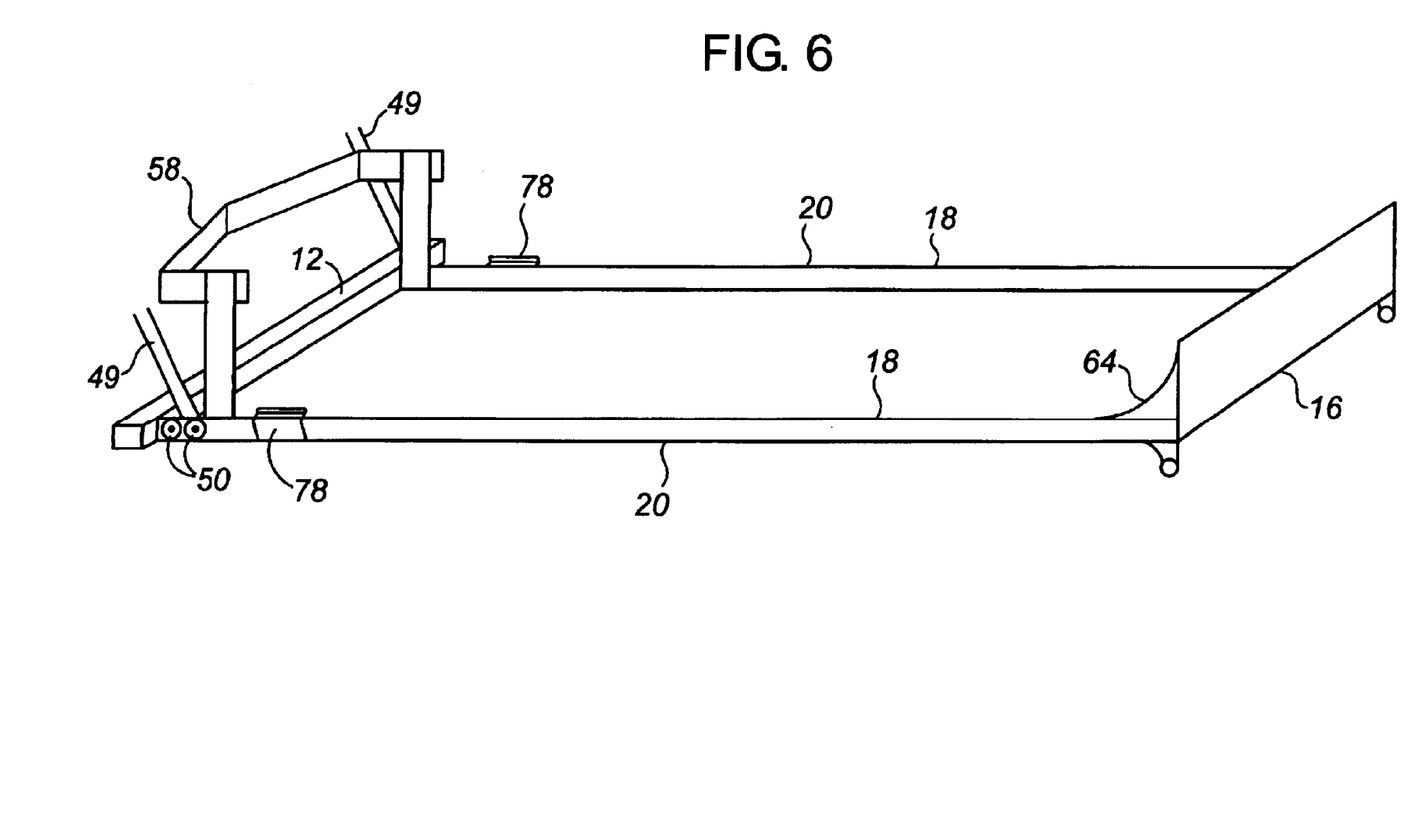
FIG. 6 is a perspective view of the support illustrated in FIG. 1, with locking dogs in a locked position.
Figure 7:
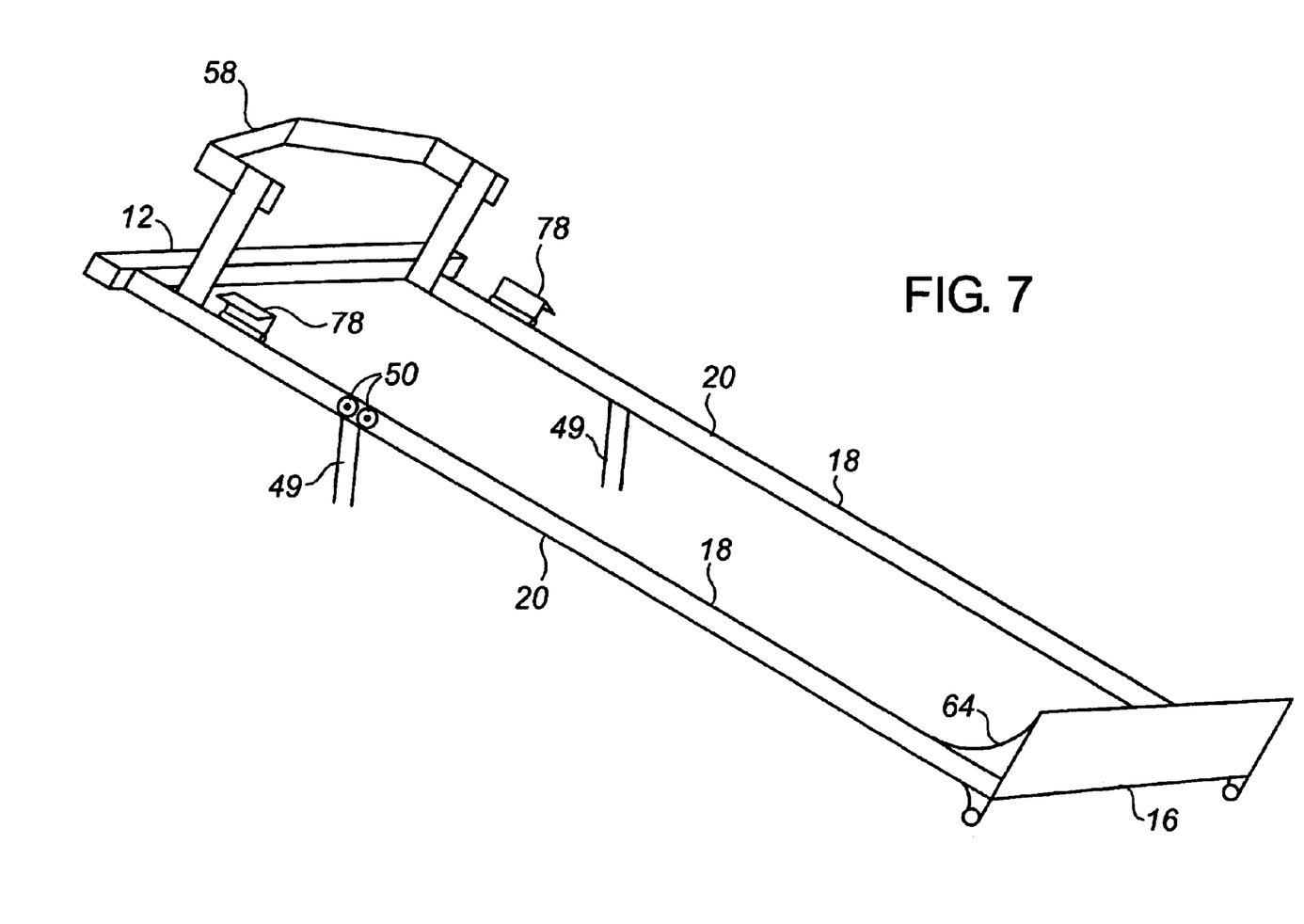
FIG. 7 is a perspective view of the support illustrated in FIG. 1, with locking dogs in an unlocked position.
Figure 8:
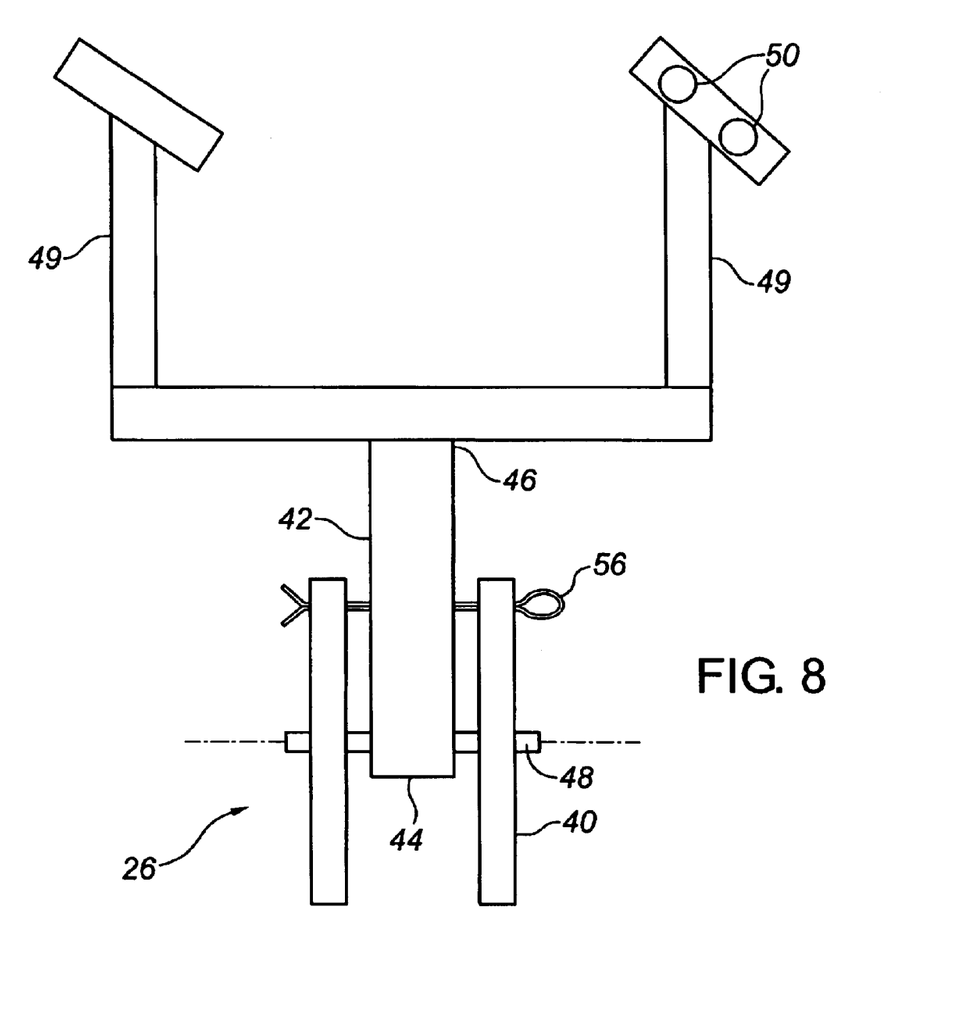
FIG. 8 is a perspective view of the pivoting member illustrated in FIG. 4, locked in an upright position with a locking pin extending through a circular pivot guide.

Referring to FIG. 8, a pair of second guides are secured to second end 46 of pivot member 42. The second guides are in the form of parallel spaced arms 49 which support guide rollers 50. Referring to FIGS. 6 and 7, guide rollers 50 engage guides tracks 20 on support 12 to facilitate relative movement of support 12 and pivot member 42.

Referring to FIGS. 1 through 4, a cable guide support 52 extends upwardly from mounting member 26. Cable guide support 52 supports a cable guide, in the form of a pulley 54.

Figure 4:
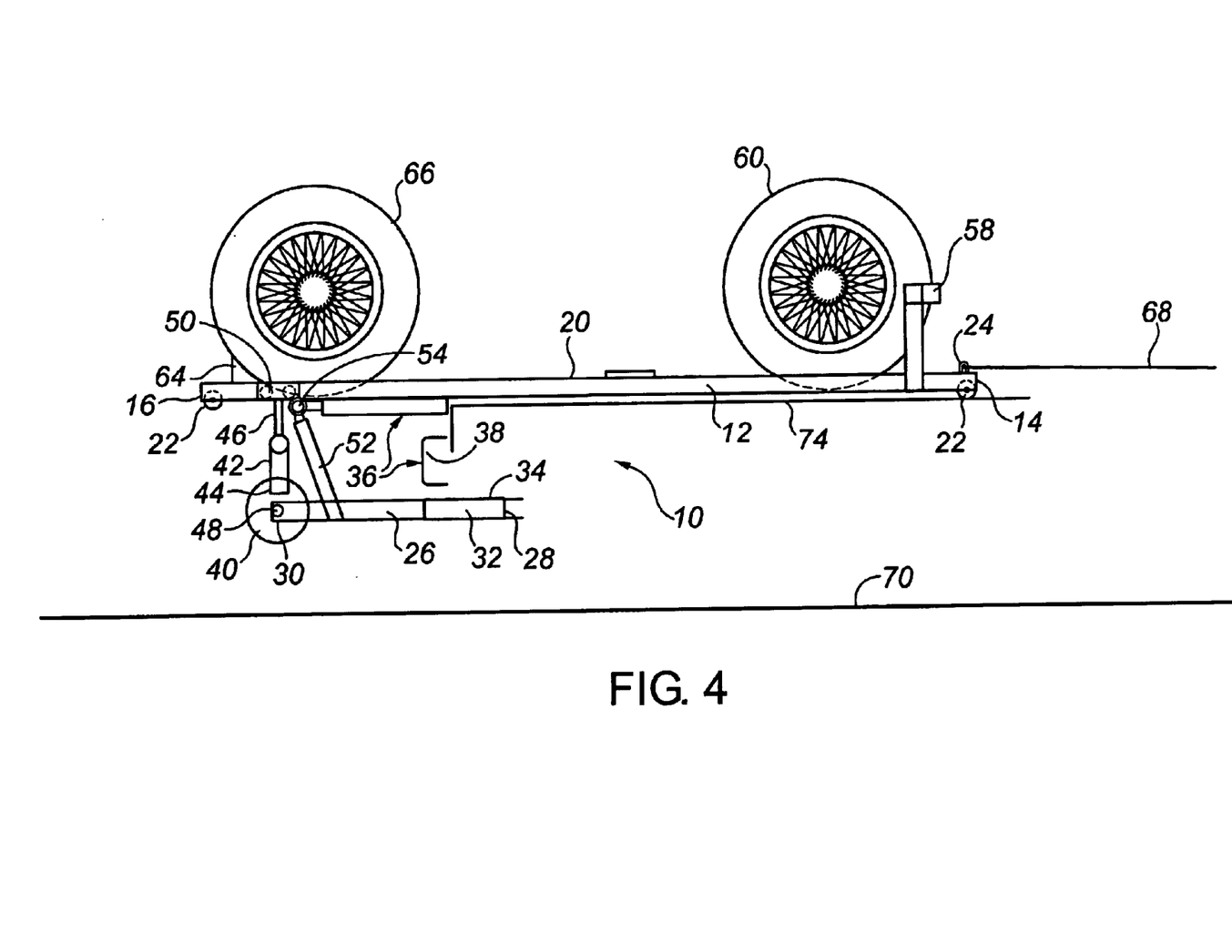
FIG. 4 is side elevation view of the motorcycle loading and unloading apparatus illustrated in FIG. 1, with support in the transport position and the pivot member in the upright position.

Referring to FIG. 8, a locking pin 56 extends through circular pivot guide 40 of mounting member 26 and pivot member 42 to lock pivot member 42 in the upright position illustrated in FIG. 4.

Referring to FIGS. 1 and 5, a stabilizing bracket 58 is provided at first end 14 of support 12 that is adapted to engage a front wheel 60 of a motorcycle. A stop 64 is provided at second end 16 of support 12 that is adapted to engage with a rear wheel 66 of the motorcycle.

As will be hereinafter further described in relation to the operation of apparatus 10, pivot member 42 is involved in two types of movements. A first movement is a pivotal movement relative to mounting member 26 as sequentially illustrated in FIGS. 1 through 4. A second movement is a relative sliding movement wherein second guides in the form of guide rollers 50 on pivotal member 42 move along first guides in the form of guide tracks 20 on support 12. In order to isolate the first movement and the second movement locking dogs 78 pivotally mounted adjacent guide track 20 on support 12, as illustrated in FIGS. 6 and 7. Locking dogs 78 pivot between a locking position illustrated in FIG. 6 and a travel position illustrated in FIG. 7. When locking dogs 78 are in the locking position they block the path of guide rollers 50, preventing guide rollers 50 from travelling along guide tracks 20.

Operation:

The use and operation of motorcycle loading and unloading apparatus 10 will now be described with reference to FIGS. 1 through 8. Referring to FIG. 1, apparatus 10 is mounted to truck 36 by inserting first end 28 of mounting member 26 into hitch receptacle 34 on truck 36. Apparatus 10 is placed in the loading position with support 12 resting on a groundsurface 70 as illustrated in FIG. 1. Rear stop 64 is be removed from support 12 so that the motorcycle can be rolled forward onto support 12 until front wheel 60 of the motorcycle engages stabilizing bracket 58. Rear stop 64 is then replaced on support 12, wedged against rear wheel 66, to prevent the motorcycle from rolling back during movement of apparatus 10 from loading position to transport position. The motorcycle is then secured to support 12 with tie down straps, not shown. The means of securing the motorcycle to support 12 is known in the art and will not be further described.

Figure 2:
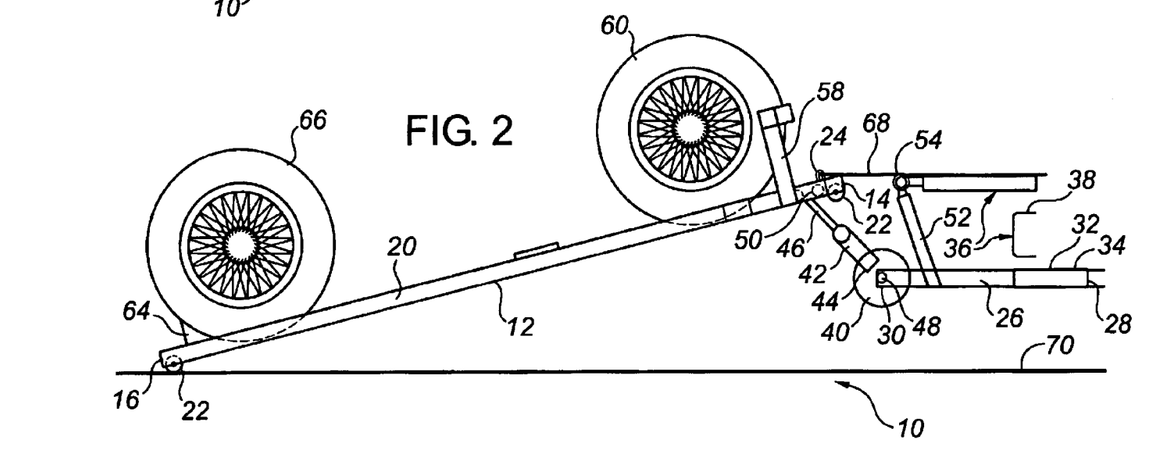
FIG. 2 is side elevation view of the motorcycle loading and unloading apparatus illustrated in FIG. 1, with the support being dragged along the ground and the pivot member positioned between the downwardly angled position and the upright position.
Figure 3:
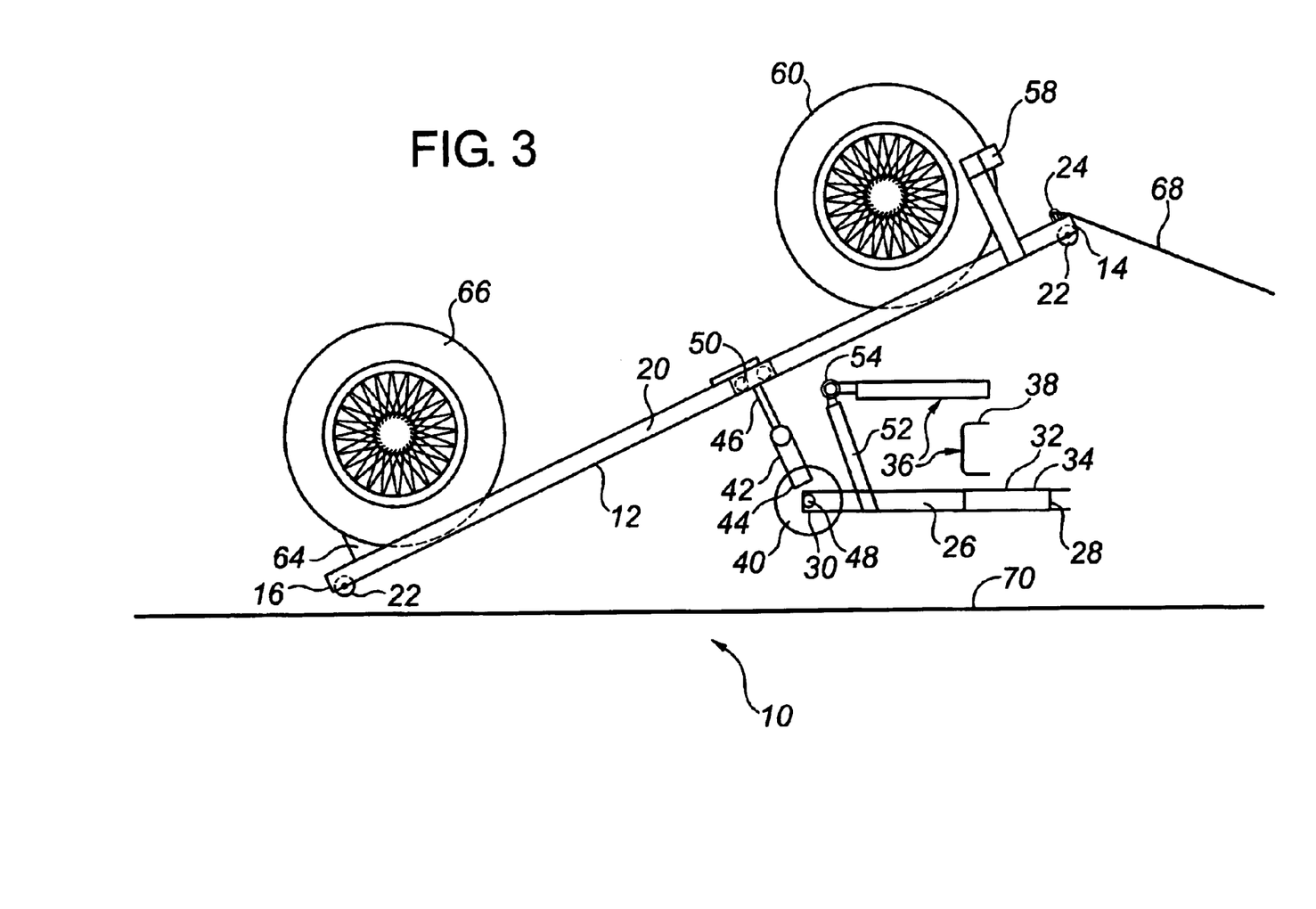
FIG. 3 is side elevation view of the motorcycle loading and unloading apparatus illustrated in FIG. 1, with the support starting to move along the pivot member as the pivot member approaches the upright position.

Referring to FIGS. 1, after the motorcycle is secure on support 12, a cable 68 is attached to cable coupling 24 at first end 14 of support 12. Locking dogs 78 are placed in a locked position as illustrated in FIG. 6, for the initial movement. A winch 72 is used to exert a force upon support 12 via cable 68 to move support 12 from a loading position resting upon groundsurface 70 behind truck 36 as illustrated in FIG. 1. As force is exerted upon support 12 by winch 72 via cable 68, movement of support 12 is accommodated by an initial pivoting of pivot member 42 which brings support 12 from its initial position resting on groundsurface 70. Referring to FIG. 2, as support 12 moves to an upwardly inclined position, pivotal member 42 pivots to an upwardly inclined position. Movement of support 12 along groundsurface 70 is made easier by underlying roller wheels 22. Referring to FIG. 3, when pivotal member 42 is at or almost at a vertical position, locking dogs 78 are moved to a travel position. With locking dogs 78 in the travel position, guide track 20 of support 12 slides along guide rollers 50 of pivot member 42. Referring to FIG. 4, by the time support 12 has been pulled to a transport position resting upon bed 74 of truck 36, guide rollers 50 have moved from first end 14 of support 12 to second end 16 and pivot member 42 is in a vertical orientation. Movement of support 12 across bed 74 of truck 36 is made easier by underlying roller wheels 22. Referring to FIG. 8, pivot member 42 is locked in this vertical orientation by locking pin 56, which extends through pivot member 42 and circular pivot guide 40 of mounting member 26.

When the motorcycle is to be unloaded, winch 72 and cable 68 provide resistance to ensure that the apparatus 10 is lowered in a controlled manner. Locking pin 56 is maintained in the locked position in FIG. 8. A manual force is provided to pull support 12 from bed 74 of truck 36. Underlying roller wheels 22 facilitate ease of movement of support 12 along bed 74. Movement of support 12 along bed 74 of truck 36 is facilitated by guide tracks 20 of support 12 sliding along guide rollers 50 of pivotal member 42. Once support 12 passes its centre of gravity, support 12 begins to pivot downwardly toward groundsurface 70 with such movement being controlled by winch 72 via cable 68. When the sliding movement of support 12 relative to pivotal member 42 is substantially complete with second end 16 of support 12 resting upon groundsurface 70, locking dogs 78 are put in the locked position illustrated in FIG. 6. Locking pin 56 is then withdrawn to enable pivotal member 42 to pivot while lowering first end 14 to support 12 to groundsurface 70, as sequentially illustrated by viewing FIG. 2 followed by FIG. 1.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A motorcycle loading and unloading apparatus, comprising:
   a motorcycle support;
   a first guide extending along the support;
   a mounting member adapted for mounting adjacent to and substantially perpendicular to a rear bumper of a truck;
   a pivot member having a first end and a second end, the first end of the pivot member being pivotally secured to the mounting member for pivotal movement about a substantially horizontal axis extending transverse to the mounting member between a downwardly angled position and an upright position;

a second guide secured to the second end of the pivot member and engaging the first guide on the support; and means for exerting a force upon the support to move the support from a loading position resting upon a groundsurface behind the truck to a transport position resting upon a bed of the truck, whereby movement of the support from the loading position to the transport position is accommodated by an initial pivoting of the pivot member from the downwardly angled position to the upright position, followed by a sliding of the first guide on the support along the second guide on the pivot member.

2. The motorcycle loading and unloading apparatus as defined in claim 1, wherein the support has opposed sides, one of a pair of first guides extending along each of the opposed sides.

3. The motorcycle loading and unloading apparatus as defined in claim 1, wherein the mounting member has a first end and a second end, the first end being a hitch adaptor adapted for insertion into a hitch receptacle of the truck.

4. The motorcycle loading and unloading apparatus as defined in claim 1, wherein the means for exerting a force upon the support to move the support from the loading position to the transport position is a winch.

5. The motorcycle loading and unloading apparatus as defined in claim 4, wherein a cable guide support extends upwardly from the mounting member supporting a cable guide.

6. The motorcycle loading and unloading apparatus as defined in claim 1, wherein the support has a first end and a second end, underlying roller wheels being rotatably mounted at the second end of the support.

7. A motorcycle loading and unloading apparatus, comprising:

a motorcycle support having a first end, a second end and opposed sides;

one of a pair of first guides extending along each of the opposed sides of the support;

underlying roller wheels rotatably mounted at the second end of the support;

a cable coupling at the first end of the support;

a mounting member having a first end and a second end, the first end being a hitch adaptor adapted for insertion into a hitch receptacle of a truck such that the mounting member is positioned adjacent to and substantially perpendicular to a rear bumper of the truck;

a pivot member having a first end and a second end, the first end of the pivot member being pivotally secured to the mounting member for pivotal movement about a substantially horizontal axis extending transverse to the mounting member between a downwardly angled position and an upright position;

a pair of second guides secured to the second end of the pivot member and engaging the pair of first guides on the support;

such that when a cable is secured to the cable coupling at the first end of the support and a force exerted upon the support via the cable and a winch to move the support from a loading position resting upon a groundsurface behind the truck to a transport position resting upon a bed of the truck, movement of the support from the loading position to the transport position is accommodated by an initial pivoting of the pivot member from the downwardly angled position to the upright position with the second guides engaging the first guides at the first end of the support with movement of the support along a groundsurface being accommodated by the underlying rollers at the second end of the support until the support is raised from the groundsurface and then the support sliding along the pivot member with the pivot member in the upright position until the second guides are positioned in the first guides at the second end of the support to move the support to the transport position.

8. The motorcycle loading and unloading apparatus as defined in claim 7, wherein a cable guide support extends upwardly from the mounting member supporting a cable guide.

9. The motorcycle loading and unloading apparatus as defined in claim 7, wherein a locking pin extends through the mounting member and the pivot member to lock the pivot member in the upright position.

10. The motorcycle loading and unloading apparatus as defined in claim 7, wherein locking dogs are positioned on the support adjacent the first guides, the locking dogs being movable between a locking position blocking the path of the second guides along the first guides and a travel position spaced from the first guides.

\* \* \* \* \*